United States Patent
Wu et al.

(10) Patent No.: US 9,941,943 B1
(45) Date of Patent: Apr. 10, 2018

(54) COORDINATE DESCENT DETECTOR AND PRECODER FOR MULTIPLE-INPUT MULTIPLE-OUTPUT (MIMO) SYSTEM

(71) Applicant: Xilinx, Inc., San Jose, CA (US)

(72) Inventors: Michael Wu, Palo Alto, CA (US); Christopher H. Dick, San Jose, CA (US); Christoph E. Studer, Ithaca, NY (US)

(73) Assignee: XILINX, INC., San Jose, CA (US)

( * ) Notice: Subject to any disclaimer, the term of this patent is extended or adjusted under 35 U.S.C. 154(b) by 6 days.

(21) Appl. No.: 15/160,847

(22) Filed: May 20, 2016

(51) Int. Cl.
*H04B 7/02* (2017.01)
*H04B 7/0456* (2017.01)
*H04B 7/0413* (2017.01)
*H04L 25/02* (2006.01)

(52) U.S. Cl.
CPC ......... *H04B 7/0456* (2013.01); *H04B 7/0413* (2013.01); *H04L 25/0242* (2013.01)

(58) Field of Classification Search
CPC ........... H04L 1/005; H04L 2025/03414; H04L 25/03292; H04L 1/0054; H04L 2025/03713; H04L 25/03242; H04L 25/03178; H04B 7/0854; H04W 28/06
USPC ............... 375/260, 340, 341, 347, 299, 262, 375/E1.025; 455/101; 714/794
See application file for complete search history.

(56) References Cited

U.S. PATENT DOCUMENTS

2012/0159122 A1* 6/2012 Anderson ............ H04B 7/0854
712/31

OTHER PUBLICATIONS

3rd Generation Partnership Project; Technical Specification Group Radio Access Network; Evolved Universal Terrestrial Radio Access (E-UTRA): Multiplexing and Channel Coding (Release 9) 3GPP Organizational Partners TS 36.212 Rev. 8.3.0, May 2008.
M. Bellanger, D. LeRuyet, D. Roviras, M. Terré, J. Nossek, L. Baltar, Q. Bai, D. Waldhauser, M. Renfors, T. Ihalainen et al., "FBMC Physical Layer: a Primer," Jan. 2010. [Online]. Available: http://www.ict-phydyas.org.
A. Farhang, N. Marchetti, and L.E. Doyle, "Low Complexity Transceiver Design for GFDM," arXiv preprint, Jan. 2015 [Online]. Available http://arxiv.org/abs/1501.02940.
I. Gaspar, M. Matthe, N. Michailow, L.L. Mendes, D. Zhang, and G. Fettweis, "GFDM Transceiver Using Precoded Data and Low-Complexity Multiplication in Time Domain," arXiv Preprint, Jun. 2015. [Online]. Available: http://arxiv.org/abs/1506.03350.
L. Hentila, P. Kyösti, M. Käske, M. Narandzic, and M. Alatossava, Matlab Implementation of the Winner Phase 11 Channel Model ver 1.1, Dec. 2007. [Online]. Available: https://www.ist-winner.org/phase_2_model.html.

(Continued)

*Primary Examiner* — Rahel Guarino
(74) *Attorney, Agent, or Firm* — David O'Brien; Hong Shi (57) ABSTRACT

A system includes an integrated circuit configured to communicating data in a channel. A channel matrix for the channel including a plurality of columns is received. A preprocessing step is performed, using a preprocessing unit, to compute a plurality of preprocessed column values corresponding to respective columns. An update step is performed, using an update unit, to update an estimation vector using a plurality of outer-loop iterations of an outer loop. Each outer-loop iteration updates the estimation vector using the plurality of preprocessed column values. An access link process is performed using the estimation vector.

20 Claims, 5 Drawing Sheets

(56) References Cited

OTHER PUBLICATIONS

Y. Hu, Z. Wang, X. Gaol, and J. Ning, "Low-complexity Signal Detection Using CG Method for Upling Large-Scale MIMO Systems," in Proc. IEEE ICCS, Nov. 2014, pp. 477-481.
W. Jiang and M. Schellmann, "Suppressing the Out-of-Band Power Radiation in Multi-carrier Systems: A Comparative Study," in IEEE Globecom, Oct. 2012, pp. 1477-1482.
Z. Kollar, L. Vargo, N. Michailow, B. Horvath, P. Bakki, and J. Bito, "Evaluation of Clipping Based Iterative PAPR Reduction Techniques for FBMC Systems," The Scientific World Journal, vol. 2014, Jan. 2014.
E. Larsson, O. Edfors, F. Tufvesson, and T. Marzetta, "Massive MIMO for Next Generation Wireless Systems," IEEE Commun. Mag., vol. 52, No. 2, pp. 186-195, Feb. 2014.
T.L. Marzetta, "Noncooperative Cellular Wireless With Unlimited Numbers of Base Station Antennas", IEEE Trans. Wireless Commun., vol. 9, No. 11, pp. 3590-3600, Nov. 2010.
N. Michailow, S.Krone, M. Lentmaier, and G. Fettweis, "Bit Error Rate Performance of Generalized Frequency Division Multiplexing," in IEEE Vehicular Technology Conference, Sep. 2012.
N. Michailow and G. Fettweis, "Low Peak-to-Average Power Ratio for Next Generation Cellular Systems, with Generalized Frequency Division Multiplexing," in Intl. Symposium on Intelligent Signal Processing and Communications Systems (ISPACS), Nov. 2013, pp. 651-655.
J. Nadal, C.A. Nour, A. Baghdadi, and H. Lin, "Hardware Prototyping of FBMC/OQAM Baseband for 5G Mobile communication Systems," in IEEE Intl. Symposium on Rapid System Prototyping, Jul. 2014, pp. 135-141.
H. Prabhu, J. Rodrigues, O. Edfors, and F. Rusek, "Approximative Matrix Inverse Computations for Very-Large MIMO and Applications to Linear Pre-Coding Systems," in Proc. IEEE WCNC, Apr. 10, 2013, pp. 2710-2715.
F. Rusek, D. Persson, B.K.Lau, E.G. Larsson, T.I. Marzetta, O. Edfors, and F. Tufvesson, "Scaling Up MIMO: Opportunities and Challenges with Very Large Arrays," IEEE Signal Process. Mag., vol. 30, No. 1, pp. 40-60, Jan. 2013.
L. Sendrei, S. Marchevsky, M. Lentmaier, and G. Fettweis, "Iterative Receiver for Clipped GFDM Signals," in 24th Intl. Conference Radioelektronika (Radioelektronika), Apr. 15-16, 2014.
S. Sesia, I. Toufik, and M. Baker, LTD, The UMTS Long Term Evolution From Theory to Practice, Wiley Publishing 2009.
P. Siohan, C. Siclet, and N. Lacaille, "Analysis and Design of OFDM/OQAM Systems based on Filterbank Theory," IEEE Transactions on Signal Processing, vol. 50, No. 5, pp. 1170-1183, May 2002.
C. Studer, S. Fatch, and D. Seethaler, "ASIC Implementation of Soft-Input Soft-Output MIMO Detection Using MMSE Parallel Interference Cancellation," IEEE J. Solid-State Circuits, vol. 46, No. 7, pp. 1754-1765, Jul. 2011.
N. E. Tunali, M.Wu, C. Dick, and C. Studer. "Linear Large-Scale MIMO Data Detection for 5G Multi-Carrier Waveform Candidates," Asilomar Conference on Signals, Systems, and Computers, 5 pgs., 2015.
A.B. Ucuncu and A.O. Yilmaz, "Out-of-Band Radiation Comparison of GFDM, WCP-COQAM and OFDM at Equal Spectral Efficiency," arXiv Preprint, Oct. 2015. (Online). Available: http://arxiv.org/abs/1510.01201.
A. Viholainen, T.Ihalainen T.H. Stitz, M. Renjorst, and M. Bellanger, "Prototype Filter Design for Filter Bank Based Multicarrier Transmission," in European Signal Processing Conference, Aug. 2009, pp. 1359-1363.
S.J. Wright, "Coordinate Descent Algorithms," Mathematical Programming, vol. 151, No. 1, pp. 3-34, Jun. 2015.
M. Wu, C. Dick, J. R. Cavallaro, and C. Studer. "FPGA Design of a Coordinate Descent Data Detector for Large-Scale MU-MIMO," IEEE International Symposium on Circuits and Systems (ISCAS), 4 pgs., 2016.
M. Wu, B. Yin, G. Wang, C. Dick, J.R. Cavallaro, and C. Studer, "Large-Scale MIMO Detection for 3GPP LTE: Algorithms and FPGA Implementations," IEEE J. Sel Topics in Sig. Proc., vol. 8, No. 5, pp. 916-929, Oct. 2014.
B. Yin, M. Wu, J.R. Cavallaro, and C. Studer, "Conjugate Gradient-Based Soft-Output Detection and Precoding in Massive MIMO Systems," in Proc. IEEE Globecom, Dec. 2014, pp. 4287-4292.
B. Yin, M. Wu, G. Wang, C. Dick, J.R. Cavallaro, and C. Studer, "A 3.8 Gb/s Large-Scale MIMO Detector for 3GPP LTE-Advanced," in Proc. IEEE ICASSP, May 2014, pp. 3907-3911.
B. Yin, M. Wu, J. Cavallaro, and C. Studer, "VLSI Design of Large-Scale Soft-Output MIMO Detection Using Conjugate Gradients," in Proc. IEEE ISCAS, May 2015, pp. 1498-1501.

* cited by examiner

Algorithm 300: Optimized Coordinate Descent (OCD)

1: inputs: $\mathbf{y}$, $\mathbf{H}$, and $N_0$
2: initialization: $\mathbf{t} = \mathbf{0}^{B \times 1}$ and $\mathbf{z}^{(0)} = \mathbf{0}^{U \times 1}$
3: preprocessing: $d_u^{-1} = (\|\mathbf{h}_u\|_2^2 + N_0)^{-1}$, $u = 1, \ldots, U$
4: for $k = 1, \ldots, K$ do
5:     for $u = 1, \ldots, U$ do
6:         $\Delta z = d_u^{-1} \mathbf{h}_u^H (\mathbf{y} - \mathbf{t})$
7:         $z_u^{(k)} = z_u^{(k-1)} + \Delta z$
8:         $\mathbf{t} = \mathbf{h}_u^H \Delta z + \mathbf{t}$
9:     end for
10: end for
11: outputs: $\tilde{\mathbf{s}} = [z_1^{(K)}, \ldots, z_U^{(K)}]^T$

COORDINATE DESCENT DETECTOR AND PRECODER FOR MULTIPLE-INPUT MULTIPLE-OUTPUT (MIMO) SYSTEM

FIELD

Examples of the present disclosure generally relate to integrated circuits ("ICs") and, in particular, to an embodiment related to adaptive data detection and adaptive precoding in a multiple-input, multiple-output ("MIMO") system.

BACKGROUND

MIMO operation in combination with spatial multiplexing is used in various wireless standards, such as IEEE 802.11n, IEEE 802.11 ac, Evolved High-Speed Packet Access (HSPA+), Worldwide Interoperability for Microwave Access (WiMAX), and Long Term Evolution (LTE) for example. In MIMO systems, multiple spatially separated users may be concurrently serviced, and multiple data streams may be concurrently transmitted in the same frequency band. However, conventional MIMO systems have ever-increasing demands on throughput, and limits on the throughput of such MIMO systems are quickly approaching due to such increasing demand. Furthermore, there is more competition for frequency bands for wireless communication.

Accordingly, it would be desirable and useful to provide a transmission and/or a reception technology that facilitates meeting a growing demand for higher throughput without a further increase in the communication bandwidth.

SUMMARY

In some embodiments in accordance with the present disclosure, a system includes an integrated circuit configured to communicating data in a channel. A channel matrix for the channel including a plurality of columns is received. A preprocessing step is performed, using a preprocessing unit, to compute a plurality of preprocessed column values corresponding to respective columns. An update step is performed, using an update unit, to update an estimation vector using a plurality of outer-loop iterations of an outer loop. Each outer-loop iteration updates the estimation vector using the plurality of preprocessed column values. An access link process is performed using the estimation vector.

In some embodiments, each outer-loop iteration includes a plurality of inner-loop iterations iterating through the plurality of columns. For each column, an inner-loop iteration updates a component of the estimation vector using a preprocessed column value corresponding to the column.

In some embodiments, a first inner-loop iteration updates a temporary vector using a correction value for a first component of the estimation vector. A second inner-loop iteration next to the first inner-loop iteration uses the updated temporary vector to update a second component of the estimation vector.

In some embodiments, for each column, the corresponding preprocessed column value is a regularized inverse squared column norm of the column expressible as:

$$d_u^{-1} = (\|h_u\|_2^2 + N_0)^{-1},$$

where $h_u$ represents the $u^{th}$ column of the channel matrix, and $N_0$ represents a noise variance.

In some embodiments, the preprocessing unit includes a dot-product unit operating in a first mode and configured to compute the plurality of preprocessed column values.

In some embodiments, the update unit includes the dot-product unit operating in a second mode and configured to compute a first value for updating the estimation vector.

In some embodiments, the preprocessing unit includes a shift unit operating in the first mode and configured to right-shift the preprocessed column value a first number of bits.

In some embodiments, the update unit includes the shift unit operating in the second mode and configured to right-shift the first value the first number of bits.

In some embodiments, the integrated circuit is configured to perform the access link process without performing a multiplication of a Hermitian-transposed channel matrix and the channel matrix, wherein the multiplication is one of an explicit multiplication and an estimate multiplication.

In some embodiments, the access link process is one of a downlink precoding process and an uplink data detection process.

In some embodiments in accordance with the present disclosure, a method includes communicating data in a channel; receiving a channel matrix for the channel, wherein the channel matrix includes a plurality of columns; performing a preprocessing step, using a preprocessing unit, to compute a plurality of preprocessed column values corresponding to respective columns; performing an update step, using an update unit, to update an estimation vector using a plurality of outer-loop iterations of an outer loop, wherein each outer-loop iteration updates the estimation vector using the plurality of preprocessed column values; and performing an access link process using the estimation vector.

In some embodiments, the method includes operating a dot-product unit in a first mode to compute the plurality of preprocessed column values.

In some embodiments, the method includes operating dot-product unit in a second mode to compute a first value for updating the estimation vector.

In some embodiments, the method includes operating a shift unit operating in the first mode to right-shift the preprocessed column value a first number of bits.

In some embodiments, the method includes operating the shift unit in the second mode to right-shift the first value the first number of bits.

In some embodiments, the performing the access link process does not include performing a multiplication of a Hermitian-transposed channel matrix and the channel matrix, wherein the multiplication is one of an explicit multiplication and an estimate multiplication.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Large-scale or massive multi-user (MU) MIMO systems use a large number of antenna units having orders of magnitude more elements at the base station compared to small-scale MIMO systems, while serving multiple users simultaneously and in the same frequency band. However, having a large number of antenna units at the base station may significantly increase the complexity of computations performed in large-scale MIMO. For example, uplink data detection at a base station may involve channel matrix inversion for each subcarrier for a linear detection scheme. For further example, downlink precoding at a base station may involve channel matrix inversion for each subcarrier for a linear precoding scheme. Along these lines, with so many more antenna units at the base station, the channel matrix becomes very large, and inversion of such a large channel matrix for each subcarrier may add a significant computational burden for uplink data detection and downlink precoding.

A large-scale MIMO system may use a large number of antennas at the base station, which may significantly increase computational complexity. With a large number of antennas at the base station, the channel matrix becomes very large. Matrix operations (e.g., multiplication, inversion) of such a large channel matrix for each subcarrier typically used in processes in both the uplink (e.g., the uplink detection process) and the downlink (e.g., the downlink precoding process) can be computationally challenging. For integrated circuit (IC) solutions, it has been discovered that an optimized coordinate descent method may be exploited to enable high performance linear data detection/precoding, which enables designs with low hardware complexity, improves IC performance in computation bandwidth or speed, power consumption, manufacturing cost, and/or form factor. Therefore, in some embodiments of the present disclosure, it is possible to perform processes in both the uplink and downlink without computing a Gram matrix for the channel matrix and the associated matrix inverse.

With the above general understanding borne in mind, various embodiments for adaptive MIMO data detection and adaptive MIMO precoding are generally described below. While some embodiments may be more useful in large-scale MIMO systems due to the large number of antenna units at the base station, small-scale MIMO systems or other wireless communication systems may also benefit from the present disclosure as described herein.

In the discussion below, boldface lower case and boldface upper case letters stand for vectors and matrices respectively. For a matrix A, its Hermitian transpose is denoted by $A^H$. For a vector a, the $k^{th}$ element of a is denoted by $a_k$.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
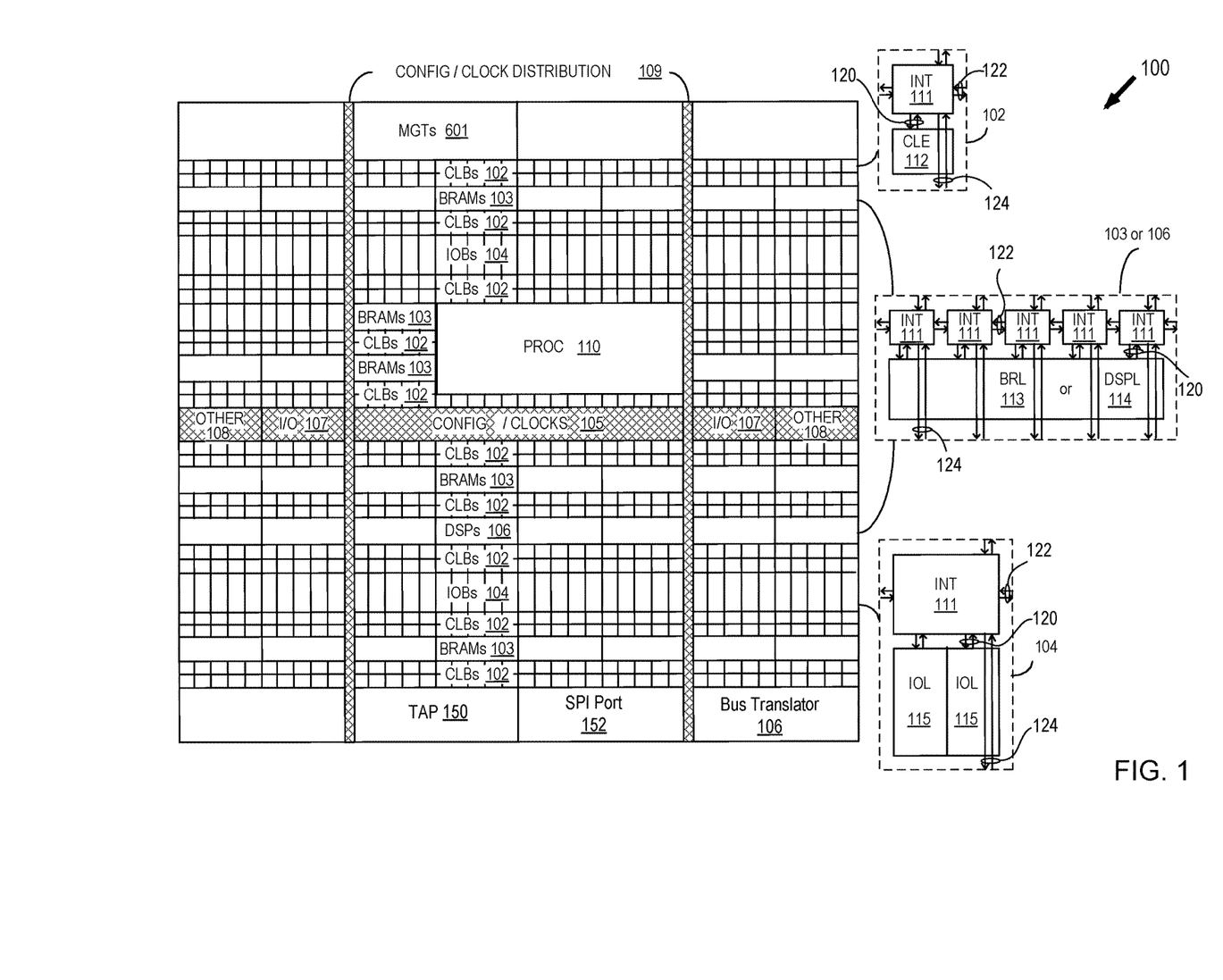
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

It is noted that the IC that may implement the adaptive MIMO data detection and adaptive precoding is not limited to the exemplary IC depicted in FIG. 1, and that IC having other configurations, or other types of IC, may also implement the adaptive MIMO data detection and adaptive precoding.

Figure 2:
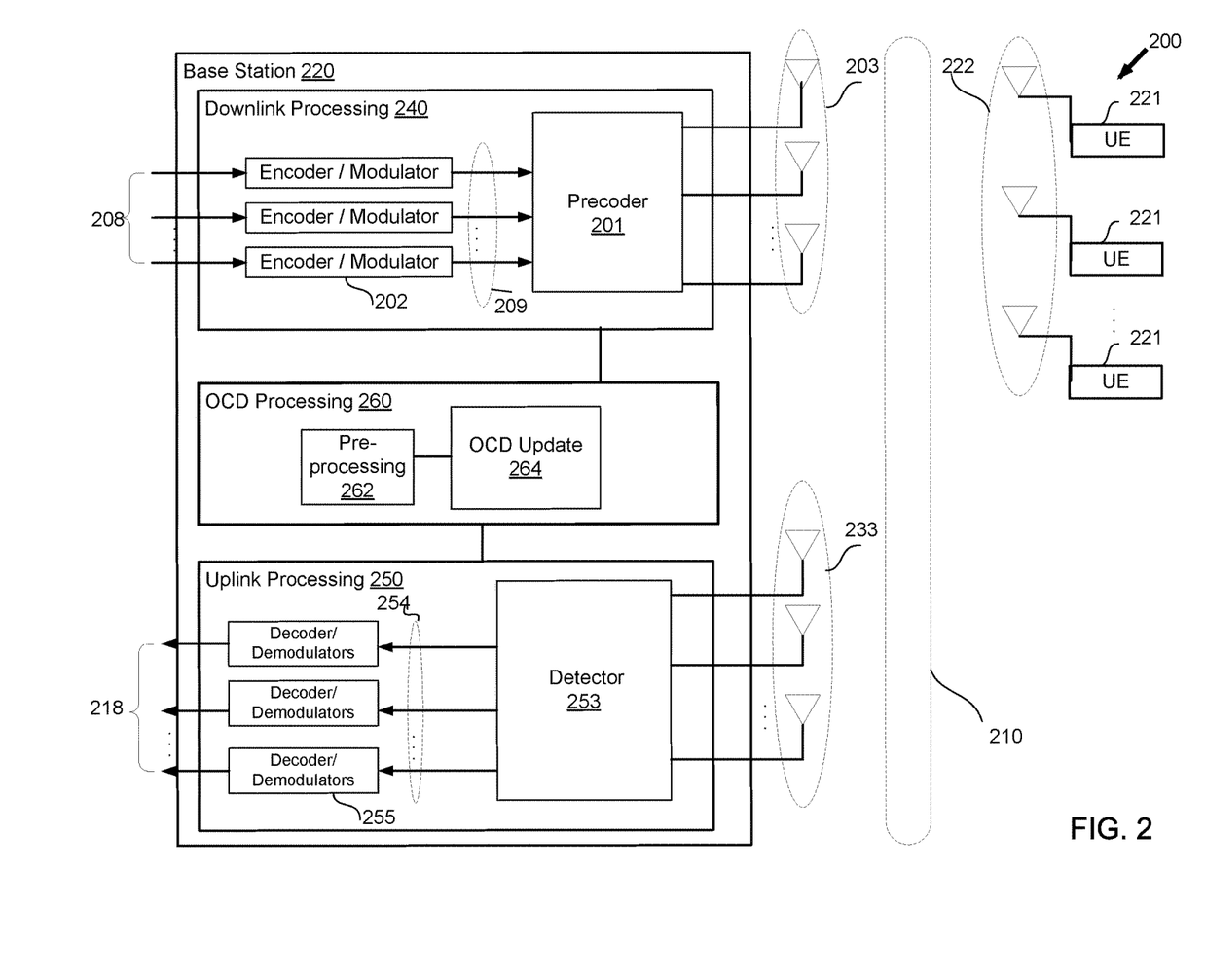
FIG. 2 is a block diagram illustrating an exemplary communication system according to some embodiments of the present disclosure.

FIG. 2 is a block diagram depicting an exemplary communication system 200. Communication system 200 includes a base station 220 and users 221 (also referred to as user devices or user equipment (UE) units). More than one user 221 may be coupled to base station 220 at a time. Users 221 may be coupled to base station 220 via over-the-air ("wireless") communication channel 210.

Communication system 200 is for bidirectional communication, namely a downlink for sending information from base station 220 to users 221, and an uplink for sending information from users 221 to base station 220. Both the downlink and uplink may be referred to as access links. Base station 220 may include a downlink processing section 240 and an uplink processing section 250, which may also be referred to as access link processing sections 240 and 250. The base station 220 may also include an OCD processing section 260, which may help facilitate and reduce complexity for computation performed by downlink processing section 240 and uplink processing section 250. In some embodiments, the OCD processing section 260 includes a preprocessing unit 262 and an OCD update unit 264.

In some embodiments, communication system 200 may be a MIMO system with B base station antennas (e.g., B transmit antennas 203 for a downlink, or B receive antennas 233 for an uplink) at base station 220 communicating with U user antennas 222 of users 221 in an access link (e.g., a downlink or an uplink), where B and U are positive integers greater than 1. It is noted that transmit antennas 203 and receive antennas 233 may have the same number of antenna units or different numbers of antenna units. Each user 221 may have a single antenna or multiple antennas 222 coupled to base station 220. An example of base station 220 concurrently serving U single antenna users may be applied straightforwardly to base station 220 concurrently serving users 221 with multiple antennas. Thus, even though U as described below may generally refer to U user antennas from U single antenna users, U may be considered to include a number of antennas of single and/or multiple antenna users being serviced by a base station 220.

In some embodiments, in the uplink, the frequency domain (FD) symbols transmitted by the i-th user 221 may be modeled as:

$$s^{(i)} = [s_1^{(i)}, \ldots, s_L^{(i)}]^T,$$

where L corresponds to the number of symbols transmitted by the i-th user. In some embodiments, for each user 221, the FD symbols are assigned onto data-carrying subcarriers and transformed to the time domain. All U users 221 then transmit their time-domain signals simultaneously over the wireless communication channel 210.

In some embodiments, at the base station 220, each receive antenna 233 may obtain a mixture of time-domain signals from all U users 221. For uplink data detection, the time-domain signals received at each receive antenna 233 are first transformed back into the frequency domain (e.g., using an inverse discrete Fourier transform (DFT)), followed by extraction of the data-carrying symbols on subcarriers. The received FD symbols $y_w$ (also referred to as receive vector) on subcarrier w received by base station 220 can be modeled as $y_w = H_w^u s_w + n_w$, with the following definitions:

$$y_w = [y_w^{(1)}, \ldots, y_w^{(B)}]^T, s_w = [s_w^{(1)}, \ldots, s_w^{(U)}]^T, n_w = [n_w^{(1)}, \ldots, n_w^{(B)}]^T, \text{ and}$$

$$H_w^u = \begin{bmatrix} h_w^{(1,1)} & \cdots & h_w^{(1,U)} \\ \vdots & \ddots & \vdots \\ h_w^{(B,1)} & \cdots & h_w^{(B,U)} \end{bmatrix}.$$

Here, $y_w^{(i)}$ is the FD symbol received on subcarrier w for the i-th receive antenna 233. $H_w^u$ is a channel matrix where $h_w^{(i,j)}$ is the frequency gain/attenuation on subcarrier w between the i-th receive antenna 233 and j-th user 221. In the following description, the superscript u to indicate an uplink side in some instances may be omitted for the sake of simplicity of exposition. The scalar $s_w^{(j)}$ denotes the symbol transmitted by the j-th user 221 on subcarrier w, and the scalar $n_w^{(i)}$ represents noise at the i-th receive antenna 233 in the frequency domain (e.g., complex i.i.d. zero-mean Gaussian noise with variance $N_0$).

In some embodiments, as shown in the example of FIG. 2, the receive vector $y_w$ and channel matrix $H_w$ may be provided to uplink processing section 250 of base station 220. Uplink processing section 250 may then perform data detection using channel matrix $H_w$ and receive vector $y_w$, which will be discussed below in additional detail below with reference to uplink process section 250.

The data detection may be performed on a per-subcarrier basis to provide an equalized FD symbol for each subcarrier. Equalized FD symbols may be used to compute log-likelihood ratio (LLR) values or soft-outputs.

Even though the description above is directed at an uplink side of a communication channel, a downlink side of a communication channel may be similarly modeled. For example, in the downlink, a base station 220 with B transmit antennas 203 may transmit a data vector (also referred to as a transmit vector) to the U single-antenna users 221. In some embodiments, to avoid or reduce multi-user interference ("MUI"), downlink processing section 240 may implement precoding to the data vector to be transmitted, which will be discussed in additional detail with reference to downlink processing section 240 and its precoder 201. A downlink channel matrix $H_w^d$ may be used to perform precoding. Like the channel matrix $H_w^u$ in the uplink, the channel matrix $H_w^d$ in the downlink on subcarrier w may be represented as follows:

$$H_w^d = \begin{bmatrix} h_w^{(1,1)} & \cdots & h_w^{(1,B)} \\ \vdots & \ddots & \vdots \\ h_w^{(U,1)} & \cdots & h_w^{(U,B)} \end{bmatrix},$$

where $h_w^{(i,j)}$ is the frequency gain/attenuation on subcarrier w between the i-th user 221 and the j-th transmit antenna 203. In many applications, channel reciprocity between an uplink channel and a downlink channel may be assumed, namely:

$$H_w^u = (H_w^d)^H.$$

In the following description, the superscripts d and u to indicate a downlink side and an uplink side in some instances may be omitted for the sake of simplicity of exposition.

The precoding may be performed on a per-subcarrier basis and result in a precoded vector for each subcarrier. A precoded vector for a particular subcarrier may be transmitted by the transmit antennas 203 over the communication channel 210 to users 221.

Base station 220 may employ an OCD processing section 260 to facilitate computation required for both uplink data detection and downlink precoding. The uplink data detection process and downlink precoding process may also be referred to as access link processes. Both uplink data detection and downlink precoding may be performed on a per-subcarrier basis, and may involve two similar computation requirements for each of the subcarriers. First, computation for a Gram matrix $G_w$ for each subcarrier w of the subcarriers may be performed. In an example of an uplink system, the Gram matrix $G_w$ is computed using the uplink channel matrix $H_w$, where $$G_w = H_w^H H_w$$

In some embodiments, a regularized Gram matrix $A_w$ is determined using the Gram matrix $G_w$, where $$A_w = G_w + N_0 I,$$

where $N_0$ represents the noise variance.

Second, subsequent matrix inversion of a regularized Gram matrix $A_w$ to determine a matrix inverse $A_w^{-1}$ for each of the subcarriers may be required. These computation requirements may be a significant portion of computation for linear data detection and/or linear precoding, including without limitation zero-forcing (ZF) or minimum-mean-square-error (MMSE) data detection and/or precoding.

In various embodiments, the OCD processing section 260 implementing an optimized coordinate descent method may be used by one or both of downlink processing section 240 (e.g., precoder 201) and uplink processing section 250 (e.g., detector 253) to reduce computational complexity in processes requiring the regularized Gram matrix $A_w$ and matrix inverse $A_w^{-1}$.

In some embodiments, on the uplink side, the uplink processing section 250 may use the OCD processing section 260 to perform adaptive data detection and reduce computational complexity. As shown in the example of FIG. 2, the uplink processing section 250 is coupled to an array of receive antennas 233 to receive information from users 221. The uplink processing section 250 may include a detector 253 and decoding and demodulation blocks 255, namely decoders and demodulators. The detector 253 may perform data detection on a per-subcarrier basis. During an uplink data detection process, for a particular subcarrier carrying data, the detector 253 may send a channel matrix $H_w$ and a receive vector $y_w$ to the OCD processing section 260. In some examples, the OCD processing section 260 computes an estimate of MMSE-equalized FD symbols $\tilde{s}_w$ using an optimized coordinate decent method, where $\tilde{s}_w = A_w^{-1} H_w^H y_w$. In such examples, the estimate $\tilde{s}_w$ is computed without computing the regularized Gram matrix $A_w$ and matrix inverse $A_w^{-1}$, which reduces computational complexity while maintaining high arithmetic precision.

In the example of FIG. 2, the OCD processing section 260 provides the estimate $\tilde{s}_w$ to the detector 253. During an uplink process, detector 253 may use $\tilde{s}_w$ to compute log-likelihood ratio (LLR) values or soft-outputs. Detector outputs 254 may be provided as inputs to decoding and demodulation blocks 255, namely decoders and demodulators. Decoding and demodulation blocks 255 may respectively output data 218.

In some embodiments, detector 253 with its blocks may be implemented in hardware, software, or a combination of hardware and software. For purposes of clarity and not limitation, in some embodiments, detector 253 may be implemented using various hardware resources, such as for example DSP slices, BRAM, and programmable resources of an FPGA; however, in other embodiments, digital signal processors, microprocessors, multi-core processors, memory, and/or other hardware may be used.

The uplink processing section 250 of base station 220 may include other details known in the art, such as a parallel-to-serial converter and a Fast Fourier Transformer, which are not described in detail herein for purposes of clarity and not limitation.

In some embodiments, the downlink processing section 240 may use the OCD processing section 260 to facilitate computation required for adaptive precoding and reduce computational complexity. As shown in FIG. 2, the downlink processing section 240 may include a plurality of encoding and modulation blocks 202, namely encoders and modulators. The encoding and modulation blocks 202 may be coupled to receive data for transmission 208, and encode and modulate the received data to provide encoded and modulated information streams 209. The encoded and modulated information streams 209 (also referred to as information streams vector) are sent to a precoder 201 for precoding. The precoding may be performed on a per-subcarrier basis.

During a downlink precoding process, for a particular subcarrier carrying data, the precoder 201 may receive encoded and modulated information streams vector $s_w$, and send a channel matrix $H_w$ and an encoded and modulated information streams vector $s_w$ to the OCD processing section 260. In some examples, the OCD processing section 260 computes a precoded vector $\tilde{q}_w$ using an optimized coordinate decent method, where $\tilde{q}_w = H_w^H A_w^{-1} s_w$. In such examples, the precoded vector $\tilde{q}_w$ is computed without computing the regularized Gram matrix $A_w$ and matrix inverse $A_w^{-1}$, which reduces computational complexity while maintaining high arithmetic precision.

In some embodiments, the precoder 201 may then provide the precoded vector $\tilde{q}_w$ to the array of transmit antennas 203 for a downlink transmission of information to users 221. In some embodiments, precoder 201 may be used for MIMO transmission of base station 220. Precoder 201 and each of its blocks may be implemented in hardware, software, or a combination of hardware and software. For purposes of clarity and not limitation, in some embodiments, precoder 201 may be implemented using various hardware resources, such as for example DSP slices, BRAM, and programmable resources of an FPGA; however, in other embodiments, digital signal processors, microprocessors, multi-core processors, memory, and/or other hardware may be used.

Other details regarding downlink processing section 240 of base station 220, such as for example a serial-to-parallel converter and an Inverse Fast Fourier Transformer as might be found in an OFDM system, among other details, are not described in detail herein for purposes of clarity and not limitation.

Figure 3:
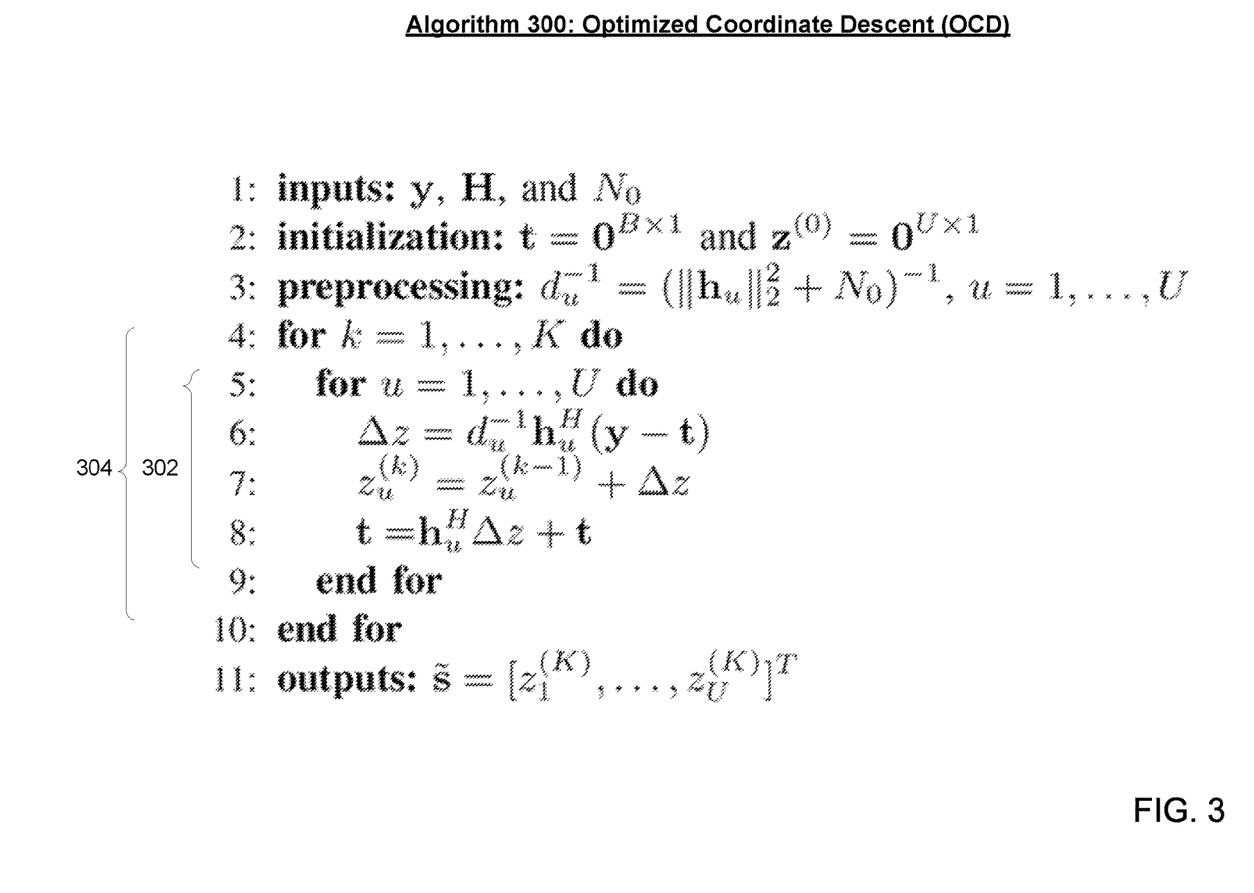
FIG. 3 is a pseudo code for a detection operation according to some embodiments of the present disclosure.
Figure 4:
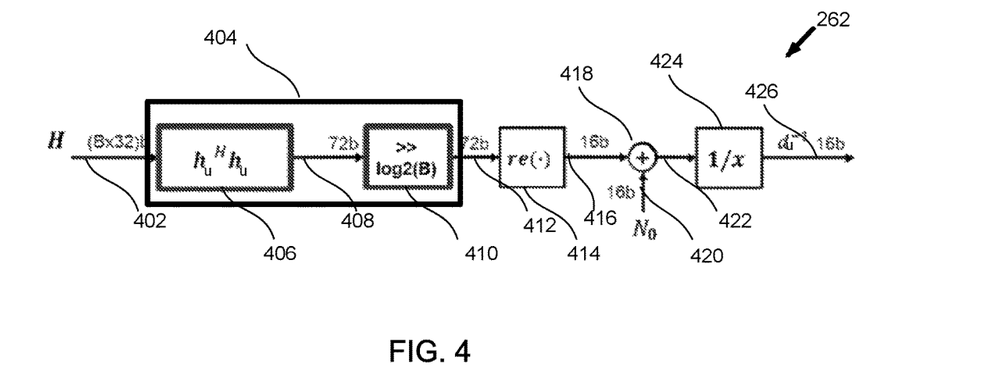
FIG. 4 is a block diagram illustrating an exemplary preprocessing element according to some embodiments of the present disclosure.
Figure 5:
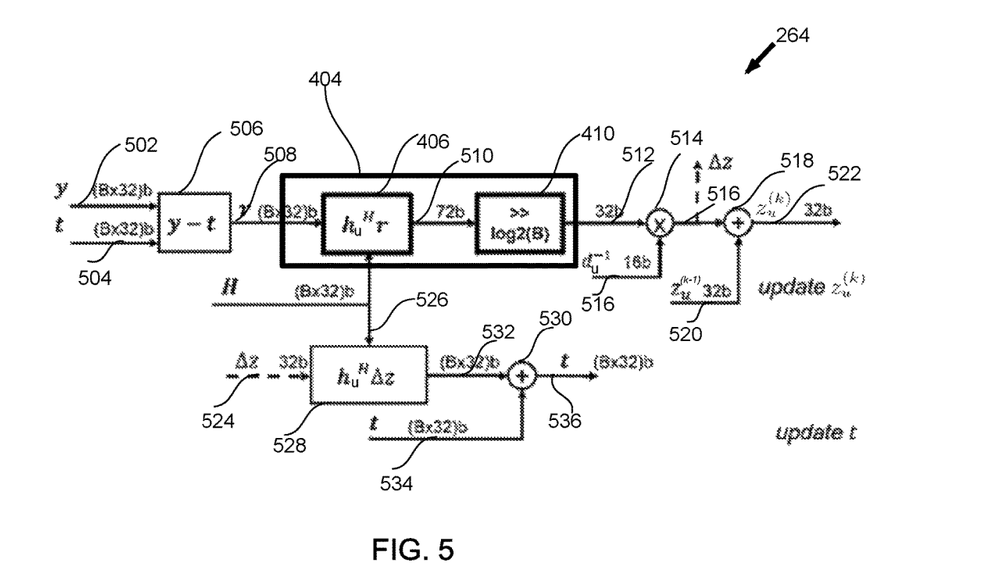
FIG. 5 is a block diagram illustrating an exemplary detection element according to some embodiments of the present disclosure.

Referring to FIGS. 3, 4, and 5, the OCD processing section 260 implementing an optimized coordinate descent method is described. Such optimized coordinate descent method may be used by one or both of the downlink processing section 240 (e.g., precoder 201) and the uplink processing section 250 (e.g., detector 253) to reduce computational complexity in processes requiring the regularized Gram matrix $A_w$ and matrix inverse $A_w^{-1}$. It is noted that while an uplink detector is used as an example in describing the optimized coordinate descent method, the optimized coordinate descent method may also be used by a linear downlink precoder 201 requiring the computation of regularized Gram matrix $A_w$ and matrix inverse $A_w^{-1}$.

In some embodiments, in an uplink system, to compute an estimate of the transmitted symbol instead of computing $\tilde{s}_w$ directly using the matrix inverse $A_w^{-1}$ by computing $A_w^{-1} H_w^H y_w$, $\tilde{s}_w$ is computed by solving the linear system of the following equation for the vector $\tilde{s}_w$:

$$A_w \tilde{s}_w = H_w^H y_w.$$

This is equivalent to solving the following regularized linear system optimization problem:

$$\tilde{s}_w = \underset{z \in C^U}{\operatorname{argmin}} \|y_w - H_w z\|_2^2 + N_0 \|z\|_2^2$$

where $z=[z_1, \ldots, z_U]$, and $u=1, \ldots, U$. In some embodiments, a coordinate descent algorithm may be used to solve the above regularized linear system optimization problem as follows:

$$f(z_1, \ldots, z_U) = f(z) = \|y_w - H_w z\|_2^2 + N_0 \|z\|_2^2,$$

where the function $f(z_1, \ldots, z_U)$ is minimized for each variable $z_u$ of a vector z independently for each $u=1, \ldots, U$. In some embodiments, the $z_1, \ldots, z_U$ may be updated in a random order to improve the performance of the coordinate descent algorithm. In some embodiments, round-robin updates are performed where $z_1, \ldots, z_U$ are updated sequentially.

To simplify notation, the subcarrier index w is omitted, for example, from the channel matrix $H_w$ and receive vector $y_w$ in the following discussion. In an embodiment, to find the optimum value $z_u$, all other values $z_j$, where j is not equal to u, are fixed. The gradient of the function $f(z)$ with respect to $z_u$ is set to zero:

$$0 = \nabla_u f(z) = h_u^H (Hz - y) + N_0 z_u.$$

By decomposing $Hz = h_u z_u + \Sigma_{j \neq u} h_j z_j$, the following expression is obtained:

$$z_u = (\|h_u\|_2^2 + N_0)^{-1} h_u^H (y - \Sigma_{j \neq u} h_j z_j), \quad (1)$$

where $h_u$ is the $u^{th}$ column of the channel matrix H. Expression (1) is also referred to as the coordinate descent update rule for the $u^{th}$ component $z_u$ of the vector z. Expression (1) may be applied to update $z_u$ for each u between 1 and U. Furthermore, the procedure may be repeated for K iterations to obtain an estimate for $s_w = z^{(K)}$, where $z^{(K)}$ is the result from the $K^{th}$ iteration, and K is a positive integer.

Referring to FIG. 3, illustrated is a pseudo code for an algorithm 300 to perform an optimized coordinate descent (OCD) method to compute an estimate $\tilde{s}_w$ of the transmitted symbol $s_w$ according to some embodiments. As illustrated in FIG. 3, at line 1, the process of the algorithm 300 may receive inputs including y, H, and $N_0$. The process of the algorithm 300 then proceeds to line 2, and performs initialization for vectors including a temporary vector t and vector $z^{(0)}$. In the example of FIG. 3, the temporary vector t is a vector including B elements, where B is the number of rows of the channel matrix H. The vector $z^{(0)}$ is a vector including U elements, where U is the number of columns of the channel matrix H.

Referring to FIGS. 3 and 4, as illustrated in algorithm 300, at line 3, a preprocessing step is performed to compute the regularized inverse squared column norms of H as follows:

$$d_u^{-1} = (\|h_u\|_2^2 + N_0)^{-1},$$

where $d_u^{-1}$ is the regularized inverse squared column norm, where $u=1, \ldots, U$, where $h_u$ is the $u^{th}$ column of the channel matrix H, and where $N_0$ is the noise variance $N_0$. This preprocessing step performed at line 3 of the algorithm 300 results in significant complexity reduction, because subsequent coordinate descent iterations do not need to compute these regularized inverse squared column norms again.

Referring to FIG. 4, illustrated therein is a block diagram of a preprocessing unit 262 of the OCD processing section 260 for performing the preprocessing step at line 3 of algorithm 300. The preprocessing unit 262 includes a dot-product unit 406, a real component unit 414, an adder 418, and a reciprocal unit 424.

In some embodiments, the preprocessing unit 262 deploys fixed-point arithmetic. In some examples, a negligible implementation loss with 16-bit precision for most internal signals is achieved.

Alternatively, as illustrated in FIG. 4, in some embodiments, the preprocessing unit 262 includes units (e.g., the common computation unit 404 and the reciprocal unit 424) that do not deploy the fixed-point arithmetic. The common computation unit 404 includes a dot-product unit 406 and a right-shift unit 410. The common computation unit 404 receives the channel matrix H at an input 402. For each integer u between 1 and U, the dot-product unit 406 computes $\|h_u\|_2^2$, where $h_u$ is the $u^{th}$ column of the channel matrix H, by first computing entry-wise products of two B-dimensional vectors $h_u^H$ and $h_u$, and then generating a sum of these entry-wise products. In some examples, a balanced adder tree including adders of a higher precision (e.g., 36-bit adders) is used to compute the sum and to achieve sufficiently high arithmetic precision.

As illustrated in the example of FIG. 4, the dot-product unit 406 outputs a signal 408 having a value $\|h_u\|^2_2$. The signal 408 is sent to the right-shift unit 410, which shifts the signal 408 by b bits to the right to generate a signal 412, where b is an integer equal to $\log_2(B)$. By such right shift, the dynamic range of the signal may be reduced. In an example, the signal 412 is then sent to a real component unit 414, which outputs a signal 416 having the real component of the signal 412. In some embodiments, the signal 416 has a bit width (e.g., 16 bits) less than that of the signal 412 (e.g., 72 bits).

As illustrated in the example of FIG. 4, the signal 416 is sent to an adder 418, which receives the noise variance $N_0$ at an input 420. The adder 418 combines the signal 416 with the noise variance $N_0$, and outputs a signal 422. The signal 422 is sent to a reciprocal unit 424 to compute $d_u^{-1}$. It is noted that the result provided at the signal 426 is effectively $d_u^{-1}$ left-shifted by b bits. As discussed below, in some embodiments, there is no need to undo the shift in subsequent steps, as the left shift to $d_u^{-1}$ will be cancelled during the multiplication at line 6 of algorithm 300.

In some examples, as illustrated in FIG. 4, the reciprocal unit 424 does not employ fixed-point arithmetic. For example, a first part of the reciprocal unit normalizes the signal 422 to the range [0.5, 1] to provide a normalized signal. A second part of the reciprocal unit generates a reciprocal value for the normalized signal and stores the normalized reciprocal value in a storage, which may then be de-normalized. The storage may be implemented using BRAM, distributed memory, FPGA off chip memory and/or other suitable memories. In an example, the storage is implemented using a BRAM including an 18-bit, 2048 entry look-up table (LUT) where the top 11 bit of the normalized value are used to point to the entry in the LUT that stores the associated normalized reciprocal value.

Referring to FIGS. 3 and 5, after performing the preprocessing step at line 3 of the algorithm 300, the algorithm 300 proceeds to lines 4-10 to perform an update step. Such update step may further reduce the complexity of the coordinate descent method. In some embodiments, in an outer loop 304 corresponding to lines 4 to 10, the algorithm 300 iterates through 1 to K, where K is a positive integer. The outer loop 304 includes K outer-loop iterations, and each outer-loop iteration updates the estimation vector z using the regularized inverse squared column norms $d_u^{-1}$, where u=1, ..., U.

During an outer-loop iteration of the outer loop 304 (e.g., the $k^{th}$ outer-loop iteration where the integer k is between 1 and K), the algorithm 300 iterates through 1 to U in an inner loop 302, which corresponds to lines 5 to 9 of the algorithm 300. In some embodiments, the inner loop 302 may iterate through 1 to U sequentially, where $z_1, \ldots, z_U$ are updated sequentially. In some embodiments, the inner loop 302 may iterate through 1 to U in a particular order (e.g., a random order or a pre-defined order), and update $z_1, \ldots, z_U$ in that particular order (e.g., in an order where $z_U$ is updated before $z_1$) to improve the performance of the coordinate descent algorithm. In some embodiments, in different outer-loop iterations, the inner loop 302 may iterate through 1 to U in different orders. For example, in the $k^{th}$ outer-loop iteration, the inner loop 302 iterates through 1 to U in a first order (e.g., updating $z_U$ before $z_1$). For further example, in the $(k+1)^{th}$ outer-loop iteration, the inner loop 302 iterates through 1 to U in a second order (e.g., updating $z_1$ before $z_U$). that is different from the first order.

Referring to FIG. 5, illustrated therein is a block diagram of an OCD update unit 264 of the OCD processing section 260 for performing the inner loop 302. In some embodiments, the OCD update unit 264 deploys fixed-point arithmetic. Alternatively, as illustrated in the example of FIG. 5, the OCD update unit 264 includes a dot-product unit 406 that does not deploy fixed-point arithmetic.

In some embodiments, the OCD update unit 264 uses a vector adder/subtractor 506, a dot-product unit 406, a right-shift unit 410, a multiplier 514, and an adder 518 for performing lines 6 and 7 of the algorithm 300. During the $u^{th}$ inner-loop iteration of the $k^{th}$ outer-loop iteration, the $u^{th}$ item $z_u$ of the vector z is updated at lines 6 and 7 using vectors $h_u$, y, and t, and the regularized inverse squared column norm $d_u^{-1}$ according to the coordinate descent update rule provided by expression (1).

In an example, the vector adder/subtractor 506 receives vector y at its input 502, and receives vector t computed from the $(u-1)^{th}$ inner-loop iteration of the $k^{th}$ outer-loop iteration at its input 504. The vector adder/subtractor 506 computes a vector r by subtracting t from y and outputs a signal 508. The dot-product unit 406 receives the signal 508 and the channel matrix H, computes $h_u^H r$, and outputs a signal 510. In some examples, the signal 510 is sent to the right-shift unit 410, which right shifts the signal 510 b bits to output a signal 512, where b is an integer equal to $\log_2(B)$. A multiplier 514 receives the signal 512 from the right-shift unit 410 and $d_u^{-1}$ computed at line 3 in the preprocessing step (e.g., from a storage), computes $d_u^{-1} h_u^H r$, and outputs a signal 516 having a correction value $\Delta z = d_u^{-1} h_u^H r$. In some examples, because the $d_u^{-1}$ received by the multiplier 514 is left-shifted b bits as discussed above with reference to FIG. 4, and the $h_u^H r$ received by the multiplier 514 is right shifted b bits, the shifts cancel when the multiplier 514 performs the multiplication of the left-shifted $d_u^{-1}$ and the right-shifted $h_u^H r$. An adder 518 receives the signal 516 having a correction value $\Delta z$, receives a signal 520 having a value $z_u^{(k-1)}$ from the $(k-1)^{th}$ outer-loop iteration, computes $z_u^{(k)}$ by applying the correction value $\Delta z$ to $z_u^{(k-1)}$ to compute $z_u^{(k)}$, and outputs a signal 522 having the value $z_u^{(k)}$. The result $z_u^{(k)}$ may be used in the $(k+1)^{th}$ outer-loop iteration for computing $z_u^{(k+1)}$.

In some embodiments, at line 8 of the algorithm 300, the OCD update unit 264 uses a scalar-by-vector multiplier 528 and an adder 530 to update the vector t. As illustrated in the example of FIG. 5, during the $u^{th}$ inner-loop iteration of the $k^{th}$ outer-loop iteration, the scalar-by-vector multiplier 528 receives $\Delta z$ (e.g., from a signal 516 provided by an output of the multiplier 514) at its input 524, and receives the channel matrix H at its input 526, computes $h_u^H \Delta z$, and outputs a signal 532. The adder 530 receives the signal 532 having the value $h_u^H \Delta z$, receives a value t form the previous inner-loop iteration (e.g., computed during the $(u-1)^{th}$ inner-loop iteration of the $k^{th}$ outer-loop iteration, or computed during the $U^{th}$ inner-loop iteration of the $(k-1)^{th}$ outer-loop iteration where u equals one) from its input 534, adds $h_u^H \Delta z$ and t, and outputs a signal 536 having an updated value t. The updated value t may be used during the next inner-loop iteration (e.g., the $(u+1)^{th}$ inner loop iteration of the $k^{th}$ outer-loop iteration, or the $1^{st}$ inner-loop iteration of the $(k+1)^{th}$ outer-loop iteration where u equals to U).

In some embodiments, the OCD processing section 260 deploys pipeline interleaving to achieve high throughput. Multiple subcarriers may be simultaneously processed by the OCD processing section 260 in an interleaved manner. In an example, after performing an outer-loop iteration of the outer loop 304 (e.g., a $k^{th}$ outer-loop iteration) for a first subcarrier w1, an outer-loop iteration of the outer loop 304 (e.g., a $k^{th}$ outer-loop iteration) for a second subcarrier w2 is started in the next clock cycle. Such interleaving process is repeated until all pipeline stages are occupied. In an example, the OCD processing section 260 uses 24 pipeline stages to achieve a maximum clock frequency of 260 MHz.

In some embodiments, the preprocessing unit 262 and the OCD update unit 264 share computation units (e.g., the common computation unit 404 including the dot-product unit 406 and the right-shift unit 410) to reduce redundant computation units and achieve low hardware complexity. As illustrated in FIGS. 4 and 5, the preprocessing step (line 3) performed using the preprocessing unit 262 and the update step (lines 4-10) performed using the OCD update unit 264 are carried out in a B-wide vector processing pipeline, which processes B-dimensional vectors at a time. In the examples of FIGS. 4 and 5, the preprocessing step and the update step of the processing pipeline shares the common computation unit 404. For example, during the preprocessing step, the common computation unit 404 is operating in a preprocessing mode as illustrated in FIG. 4. For further example, during the update step, the common computation unit is operating in an update mode as illustrated in FIG. 5.

Referring to FIG. 3, after the algorithm 300 finishes iterating though 1 and K in the outer loop 304, the algorithm 300 proceeds to line 11, and outputs the symbol estimate $\tilde{s}$ using the vector z from the $K^{th}$ outer-loop iteration.

The OCD processing section 260, including the preprocessing unit 262 and the OCD update unit 264, may be implemented in hardware, software, or a combination of hardware and software. In some embodiments, the OCD processing section 260 may be implemented using various hardware resources, for example, DSP slices, BRAM, and programmable resources of an FPGA. In some embodiments, digital signal processing (DSP) processors, microprocessors, multi-core processors, memory, general purpose processors (GPP) and/or other hardware may be used. The OCD processing section 260 may carry out computations by using a processor, which may be embedded in an FPGA, instantiated in FPGA fabric, or externally coupled to an FPGA.

Figure 6A:
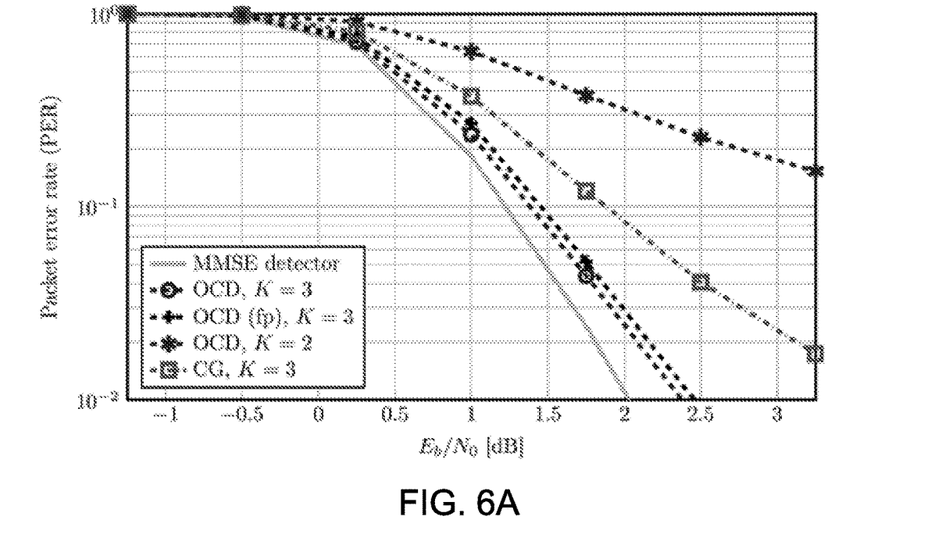
FIGS. 6A and 6B illustrate performance comparison between various embodiments according to the present disclosure.
Figure 6B:
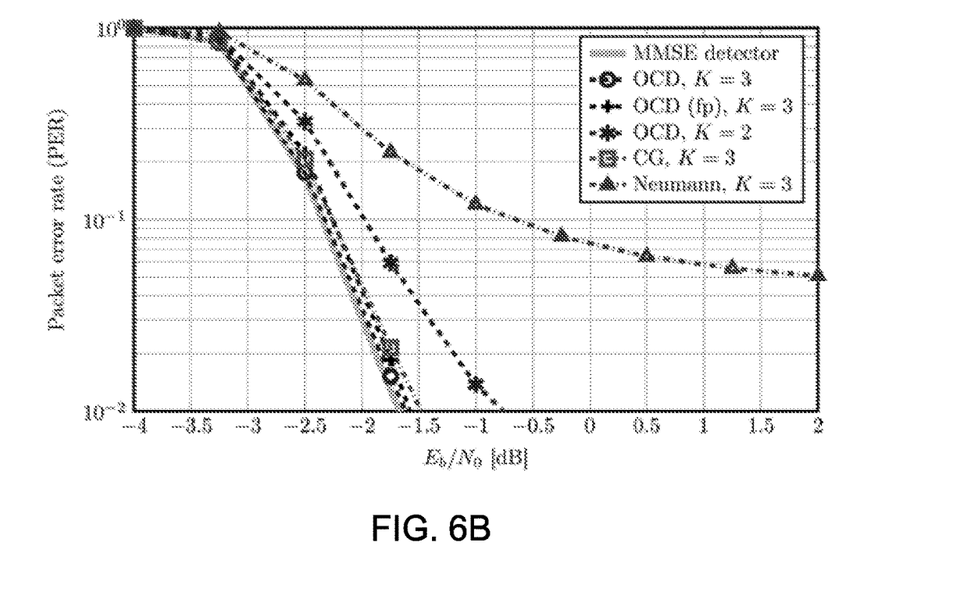

Referring now to the examples of FIGS. 6A and 6B, illustrated therein are example simulations showing packet error rate (PER) against signal-to-noise ratio (SNR) for uplink data detection according to various embodiments with different configurations (e.g., receive antenna number of base station denoted by B, user antenna number denoted by U, and/or spacing parameters denoted by s). FIGS. 6A and 6B correspond to two communication systems with different base station antenna number and user antenna number configurations. For example, FIG. 6A corresponds to a communication system with sixty-four base station receive antennas and eight user antennas, and FIG. 6B corresponds to a communication system with one hundred and twenty-eight base station receive antennas and eight user antennas. In the example of FIG. 6A, five PER curves correspond to five embodiments for data detection are illustrated. Those embodiments include an exact linear MMSE detector as a reference, an OCD detector with three iterations (e.g., K equals 3), an OCD fixed-point detector with three iterations (e.g., K equals 3), an OCD with two iterations (e.g., K equals 2), and a conjugate gradients (CG)-based detection with three iterations (e.g., K equals 3).

In the example of FIG. 6B, six PER curves correspond to six embodiments for data detection are illustrated. Those embodiments include an exact linear MMSE detector as a reference, an OCD detector with three iterations (e.g., K equals 3), an fixed-point OCD detector with three iterations (e.g., K equals 3), an OCD with two iterations (e.g., K equals 2), a conjugate gradients (CG)-based detector with three iterations (e.g., K equals 3), and a Neumann-series detector (e.g., K equals 3).

In the simulation, a 20 MHz 3rd Generation Partnership Project (3GPP) Long-Term Evolution (LTE) uplink system using SC-FDMA with 64-QAM and a rate-3/4 turbo code. A WINNER-Phase-2 channel model with 7.8 cm antenna spacing is considered. A log-map turbo decoder is used for channel decoding. As shown in the examples of FIGS. 6A and 6B, PER performance of embodiments employing optimized OCD may become very close to the PER performance of the exact linear MMSE detector as the base station receive antenna number grows. Additionally, as shown in FIGS. 6A-6B, the OCD detector outperforms the fixed-point OCD detection, which outperforms the conjugate gradients (CG)-based detector and the Neumann-series detector with the same iteration count K.

It is noted that various configurations (e.g., B, U, K) illustrated in FIGS. 2, 3, 4, 5, 6A, and 6B are exemplary only and not intended to be limiting beyond what is specifically recited in the claims that follow. It will be understood by those skilled in that art that other configurations may be used. Additionally, while the examples of FIGS. 6A-6B are directed at uplink data detection processes, performance and operation count analysis for downlink precoding processes may be substantially similar.

Various advantages may be present in various applications of the present disclosure. No particular advantage is required for all embodiments, and different embodiments may offer different advantages. One of the advantages of some embodiments is that computational complexity is reduced for access link processes (e.g., the uplink data detection process and downlink precoding process) in a communication system by using an optimized coordinate descent method. In one example, instead of computing a Gram matrix and its matrix inverse, an estimate of equalized FD symbols is achieved by solving a regularized linear system optimization problem designed for the equalized FD symbols. Furthermore, an optimized coordinate descent method is used to solve the regularized linear system optimization problem, which reduces the computational complexity. In an example, the optimized coordinate descent method performs a preprocessing step to pre-compute particular values for columns of a channel matrix, such that these values do not need to be recalculated in subsequent iterations in the update step of the optimized coordinate descent method. Moreover, in some examples, a two-step approach is adopted for each inner-loop iteration of the optimized coordinate descent method to further reduce the computing complexity. In the first step, a component of an estimation vector is updated. In the second step, a temporary vector is updated using the updated component, and is used to carry information to the next iteration. Another advantage of some embodiments is that hardware complexity is reduced by carrying out the preprocessing step and the update step in a processing pipeline, such that the preprocessing step and the update step may share computation units (e.g., the dot-product unit and the shift unit).

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:
1. A system, comprising
an integrated circuit configured to:
   communicate data in a channel;
   receive a channel matrix for the channel, wherein the
      channel matrix includes a plurality of columns;

perform a preprocessing step, using a preprocessing circuit, to compute a plurality of preprocessed column values corresponding to respective columns;

perform an update step, using an update unit, to update an estimation vector using a plurality of outer-loop iterations of an outer loop, wherein each outer-loop iteration updates the estimation vector using the plurality of preprocessed column values; and perform an access link process using the estimation vector.

2. The system of claim 1, wherein each outer-loop iteration includes a plurality of inner-loop iterations iterating through the plurality of columns, and wherein for each column, an inner-loop iteration updates a component of the estimation vector using a preprocessed column value corresponding to the column.

3. The system of claim 2, wherein a first inner-loop iteration updates a temporary vector using a correction value for a first component of the estimation vector, and wherein a second inner-loop iteration next to the first inner-loop iteration uses the updated temporary vector to update a second component of the estimation vector.

4. The system of claim 2, wherein the preprocessed column value is a regularized inverse squared column norm expressible as:

$$d_u^{-1} = (\|h_u\|_2^2 + N_0)^{-1},$$

where $h_u$ represents the $u^{th}$ column of the channel matrix, and $N_0$ represents a noise variance.

5. The system of claim 1, wherein the preprocessing circuit includes a dot-product unit operating in a first mode and configured to compute the plurality of preprocessed column values.

6. The system of claim 5, wherein the update unit includes the dot-product unit operating in a second mode and configured to compute a first value for updating the estimation vector.

7. The system of claim 6, wherein the preprocessing circuit includes a shift unit operating in the first mode and configured to right-shift a preprocessed column value of a first number of bits.

8. The system of claim 7, wherein the update unit includes the shift unit operating in the second mode and configured to right-shift the first value of the first number of bits.

9. The system of claim 1, wherein the integrated circuit is configured to perform the access link process without performing a multiplication of a Hermitian-transposed channel matrix and the channel matrix, wherein the multiplication is one of an explicit multiplication and an estimate multiplication.

10. The system of claim 1, wherein the access link process is one of a downlink precoding process and an uplink data detection process.

11. A method, comprising:
communicating data in a channel;
receiving a channel matrix for the channel, wherein the channel matrix includes a plurality of columns;
performing a preprocessing step, using a preprocessing unit, to compute a plurality of preprocessed column values corresponding to respective columns;
performing an update step, using an update unit, to update an estimation vector using a plurality of outer-loop iterations of an outer loop,
wherein each outer-loop iteration updates the estimation vector using the plurality of preprocessed column values; and
performing an access link process using the estimation vector.

12. The method of claim 11, wherein each outer-loop iteration includes a plurality of inner-loop iterations iterating through the plurality of columns, and wherein for each column, an inner-loop iteration updates a component of the estimation vector using a preprocessed column value corresponding to the column.

13. The method of claim 12, wherein a first inner-loop iteration updates a temporary vector using a correction value for a first component of the estimation vector, and wherein a second inner-loop iteration next to the first inner-loop iteration uses the updated temporary vector to update a second component of the estimation vector.

14. The method of claim 12, wherein the preprocessed column value is a regularized inverse squared column norm expressible as:

$$d_u^{-1} = (\|h_u\|_2^2 + N_0)^{-1},$$

where $h_u$ represents the $u^{th}$ column of the channel matrix, and represents a noise variance.

15. The method of claim 11, further comprising:
operating a dot-product unit in a first mode to compute the plurality of preprocessed column values.

16. The method of claim 15, further comprising:
operating dot-product unit in a second mode to compute a first value for updating the estimation vector.

17. The method of claim 16, further comprising:
operating a shift unit operating in the first mode to right-shift the preprocessed column value of a first number of bits.

18. The method of claim 17, further comprising:
operating the shift unit in the second mode to right-shift the first value of the first number of bits.

19. The method of claim 11, wherein the performing the access link process does not include performing a multiplication of a Hermitian-transposed channel matrix and the channel matrix, wherein the multiplication is one of an explicit multiplication and an estimate multiplication.

20. The method of claim 11, wherein the access link process is one of a downlink precoding process and an uplink data detection process.

* * * * *